(12) United States Patent
Biondo et al.

(10) Patent No.: US 6,279,983 B1
(45) Date of Patent: Aug. 28, 2001

(54) METHOD OF INSTALLING AUTOMOTIVE WINDOW MOLDING

(75) Inventors: James R. Biondo, Oakland County, MI (US); Jack D. Young, Montgomery County, OH (US)

(73) Assignee: Creative Extruded Products, Inc., Tipp City, OH (US)

( * ) Notice: Subject to any disclaimer, the term of this patent is extended or adjusted under 35 U.S.C. 154(b) by 0 days.

(21) Appl. No.: 09/697,949

(22) Filed: Oct. 30, 2000

(51) Int. Cl.[7] .......................................................... B60J 1/02
(52) U.S. Cl. .......................................... 296/93; 52/204.591
(58) Field of Search ........................ 296/93, 201, 146.15; 52/204.591, 204.597

(56) References Cited

U.S. PATENT DOCUMENTS

| 3,807,107 | * | 4/1974 | Davis | ........................... 52/204.591 X |
|---|---|---|---|---|
| 4,950,019 | | 8/1990 | Gross | ....................................... 296/93 |
| 5,154,028 | | 10/1992 | Hill et al. | ................................. 52/208 |
| 5,311,711 | | 5/1994 | Desir, Sr. | ................................. 52/208 |
| 5,338,087 | | 8/1994 | Gross et al. | .......................... 296/146 |
| 5,538,314 | | 7/1996 | Young et al. | ..................... 296/146.15 |
| 5,669,131 | * | 9/1997 | Gold | ..................................... 296/93 X |
| 6,179,940 | * | 1/2001 | Escobar-Y-Gamboa et al. | ........................................................... 52/204.591 X |

FOREIGN PATENT DOCUMENTS

| 2219338-A | * | 12/1989 | (GB) | ....................................... 296/93 |
|---|---|---|---|---|
| 4-163225-A | * | 6/1992 | (JP) | ........................................ 296/93 |

* cited by examiner

Primary Examiner—Joseph D. Pape
Assistant Examiner—Patricia Engle
(74) Attorney, Agent, or Firm—Reuben Wolk

(57) ABSTRACT

A method of installing automotive window trim molding by applying a pair of spaced parallel gripping and retaining members on opposing planar surfaces of the window edge, adhering only one of the members to one of the surfaces, and subsequently removing all but the adhered member.

20 Claims, 2 Drawing Sheets

METHOD OF INSTALLING AUTOMOTIVE WINDOW MOLDING

BACKGROUND OF THE INVENTION

This invention relates to a method of installing a window trim molding for adhering to a planar edge surface of the outer periphery of a fixed automotive window.

PRIOR ART STATEMENT

It is known to provide a window trim molding around the periphery of the edge of the window by forming spaced opposing members interconnected by a member at approximately right angles thereto, thereby forming a U-shaped channel into which the edge of the window is inserted. The opposing members closely grip and retain the outer and inner planar surfaces of the window edge, and the surface of the interconnecting member contacts the vertical edge of the window between the planar surfaces. Adhesion between the members and the window edge may be provided by application of an adhesive to the contacted surfaces of the window edge while a primer, acting as an adhesion promoter, may be applied to the contacting surfaces of the molding. This provides the maximum adhesion between the window and the molding members. Such a construction is shown, for example, in U.S. Pat. Nos. 4,950,019 to Gross; 5,338,087 to Gross et al; and 5,538,314 to Young et al; all of common assignment. In these constructions, a portion of the outer gripping member also conceals the space between the edge of the window and an adjacent body panel.

A second type of molding may be applied to the inner planar surface only of the window so that the edge of the window is not concealed. The molding member is adhered to the window edge by use of a similar adhesive and compatible primer, and may have an attached flexible member that extends into the space between the window edge and the body panel. A typical patent showing such a construction is U.S. Pat. No. 5,154,028, issued to Hill et al. Two pending applications filed by one of the Applicants herein are Ser. No. 09/488,049, filed Jan. 20, 2000; and 09/548,850, filed Apr. 13, 2000. These applications refer to both types of construction discussed above, one of which utilizes members gripping and retaining the outer and inner planar surfaces of the window edge and the vertical window edge; and the other having a single member adhered to only the inner planar surface of the window edge. These applications also refer to other related prior art, which is now brought to the attention of the PTO. The salient feature of these applications is in the use of a co-extruded material on the window edge-contacting surface or surfaces of the window edge, in lieu of the primer material. This concept is also incorporated herein as a modified form of the invention.

SUMMARY OF THE INVENTION

The present invention provides for a method of installing a molding around the periphery of the window edge wherein the molding initially is similar to the type of molding having gripping and retaining members on both planar surfaces, thus providing maximum holding and alignment of the molding on the window. However, adhesion is provided between the inner member of the molding and the inner planar surface of the window edge only; but not between the outer member and the outer planar surface of the window; and not between the interconnecting member of the molding and the vertical window edge. These last two members are subsequently removed so that only the inner molding member remains adhered to the window edge, and the outer planar surface of the window edge is exposed. By using previously installed indicia at the plane of intersection of the lower member and the interconnecting member, to designate the portions to be removed, the desired member remains adhered to the window. A flexible member, similar to that shown in U.S. Pat. No. 5,154,028, is also part of the remaining adhered molding member and extends into the space between the body panel and the window edge.

The process utilized herein, and the related molding construction, thus provides a superior initial grip of the molding on the window edge than if done as in the prior art processes. This minimizes the chance of misalignment of the adhered member, and also avoids the use of expensive and cumbersome aligning mechanisms which would be required if the adhered member were to be applied, as in the prior art. This process also lessens the possibility of the adhered member pulling away during assembly. The adhesion referred to herein may be either achieved by applying the adhesive on the inner planar surface of the window edge, in combination with a primer on the contacting surface of the molding member; or in combination with a co-extruded elastomeric material on the contacting surface of the molding member, as discussed above.

It is a principal object of the invention to provide an improved installation of a window trim molding on an automotive window.

It is a further object to provide a secure and accurate installation of such a window trim molding.

These and other objects and features will become apparent from the embodiments described and shown herein.

DESCRIPTION OF THE PREFERRED EMBODIMENT

Figure 1:
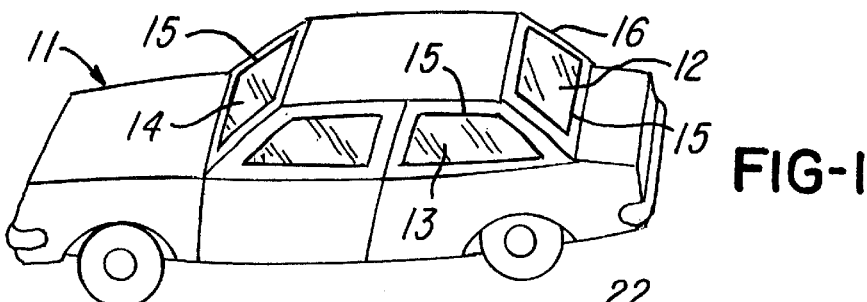
FIG. 1 is a perspective view of a typical automotive vehicle illustrating various locations of the novel molding.
Figure 2:
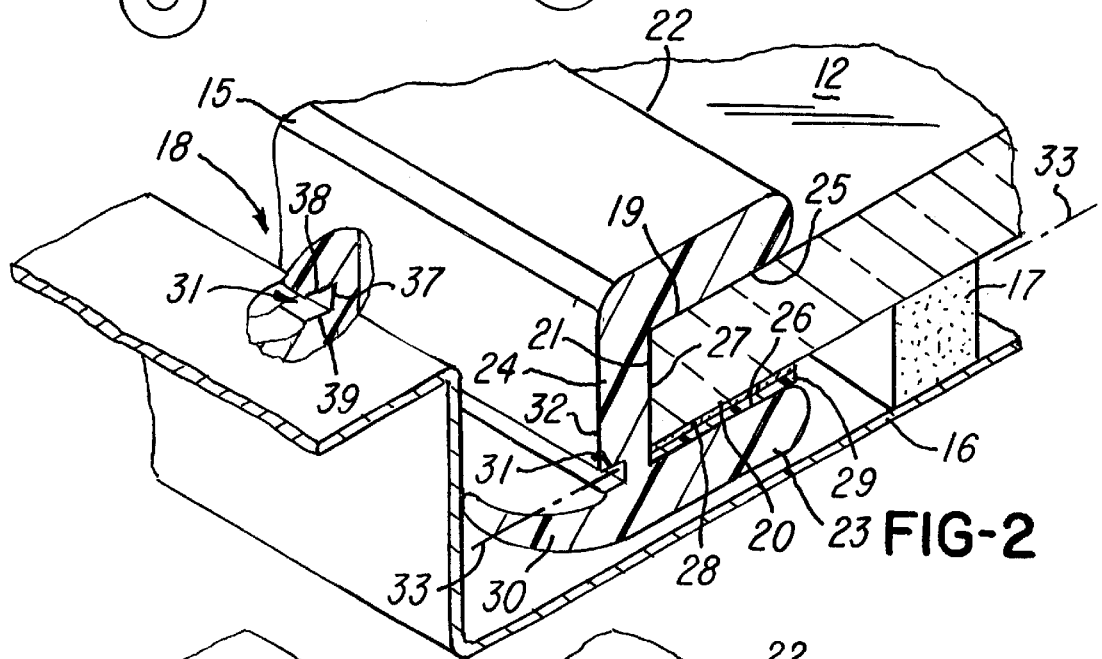
FIG. 2 is an enlarged sectional and perspective view of a novel molding installed on one of the window locations.

As shown in FIG. 1, the automobile 11 is typical of a motor vehicle which includes a fixed rear window 12, fixed side windows 13, and the windshield 14. The novel molding 15 is manufactured as a continuous strip and extends around at least a portion of the window, as required. The molding is typically composed of an elastomeric material such as polyvinyl chloride, having a hardness of about 80 to 90 Shore A, and may include filler material. The molding is initially installed around the edge of the window, typically the rear window12, which is secured to a body panel 16 by means of an adhesive 17. The edge of the window is adjacent to the body panel, and separated by a space 18. As described herein, the term "edge" comprises the outer portion of the outer planar surface 19, the outer portion of the inner planar surface 20, and the vertical surface 21 extending therebetween. The molding is primarily composed of outer and inner gripping and retaining members 22 and 23 and an interconnecting member 24 which extends generally vertically therebetween. The members 22, 23 and 24 then form a U-shaped channel into which the window edge is received. The member 22 has an inner surface 25 contacting the outer planar surface of the window edge, and the member 23 has an inner surface 26 contacting the inner planar surface of the window edge. The interconnecting member 24 has an inner surface 27 contacting the surface 21 of the window. Extending outwardly and approximately coplanar with the member 23 is an integral segment 30 which forms a flexible member. When the molding is installed on the window edge, this segment extends into the space 18 to partially conceal this space from view. An adhesive material 28 is applied to the inner planar surface 20 of the window edge, a preferred material being urethane, which is applied in the form of a bead about 0.025 to 0.050 inch thick. A thin layer of a liquid primer 29, which is compatible with the adhesive, is applied to the surface 26. This may be a conventional material, such as a blend of methyl ethyl ketone, toluene, and methyl methacrylate. The primer is applied to the molding surface prior to installation of the molding on the window edge, and adhesion occurs when surfaces 20 and 26 are in contact with the adhesive material 28. Pressure of the installation will cause the bead of adhesive 28 to become thinner; namely about 0.010 to 0.020 inch. The surfaces 25 and 27 are not similarly adhered. A notch 31 is formed into the surface 32 opposite the surface 27, this notch extending along the entire extent of the molding strip and located at the plane 33 along the inner planar surface 20 of the window edge.

Figure 3:
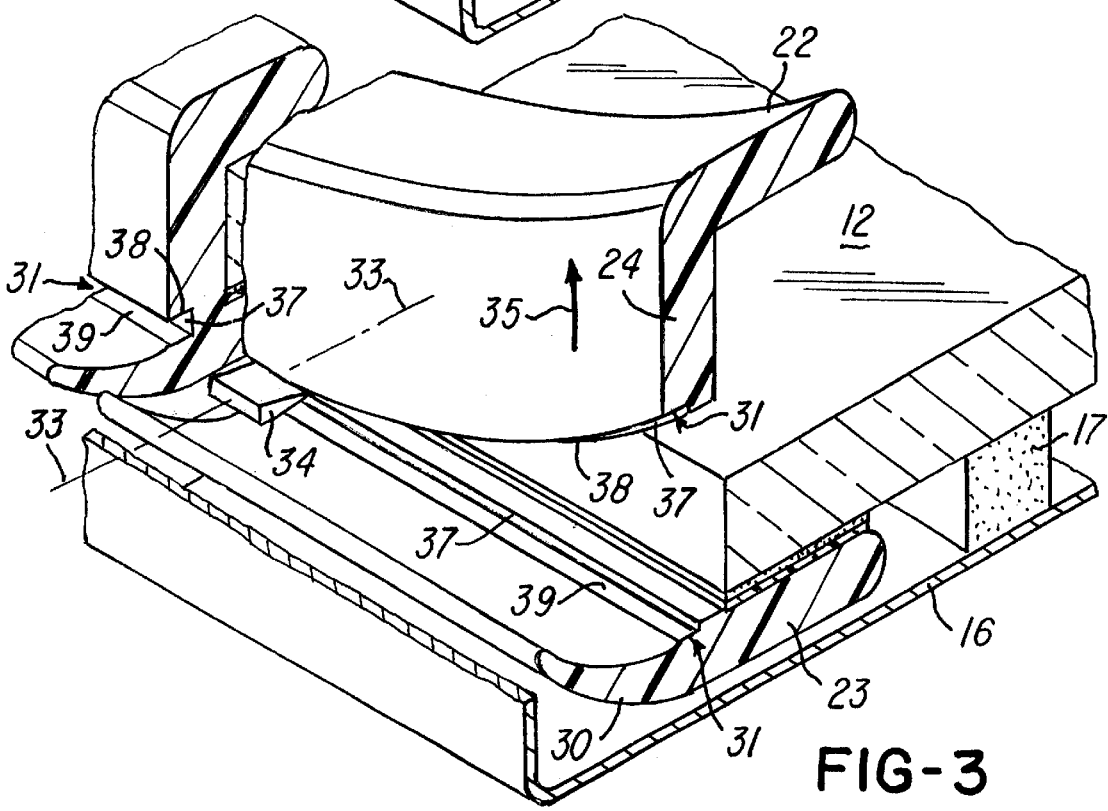
FIG. 3 is a view similar to FIG. 2 illustrating removal of portions of the molding and retention of a portion thereof.
Figure 4:
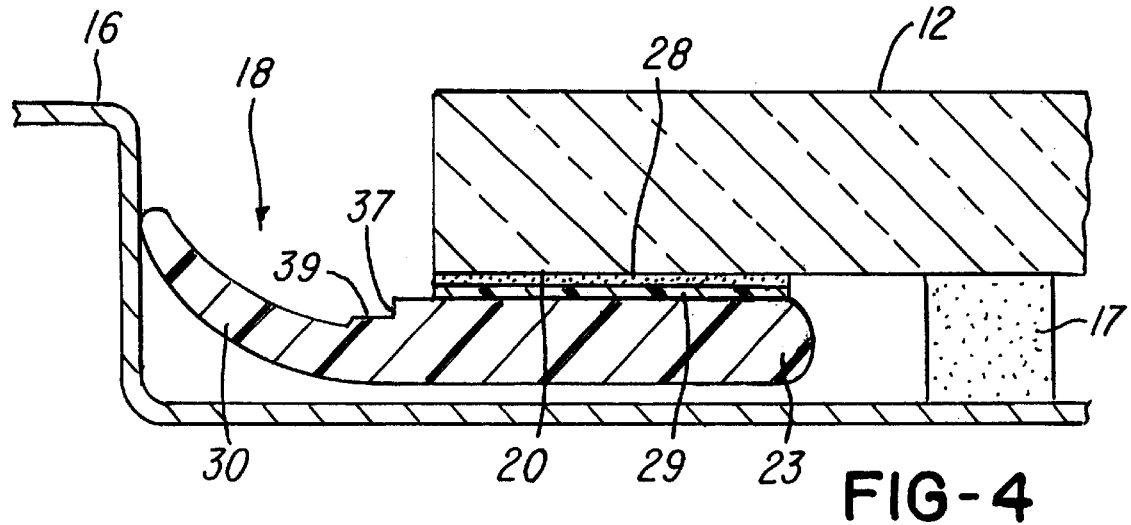
FIG. 4 is a sectional view of the molding installed on a portion of the window edge, after removal of certain portions.

When the above described assembly is complete, and the adhesive is dried to provide permanent attachment of the member 23 to the surface 20, the next step is the removal of the non-adhered members 22 and 24. As shown in FIG. 3, this is done by applying a slitting mechanism 34 at the point of indicia, which acts as a cut line. A typical indicia is in the form of the rectangular notch, having a vertical wall 37 and horizontal walls 38 and 39, but may be of any other practical shape. The slitting mechanism cuts through the interconnecting member 24, allowing the freed members 22 and 24 to be pulled away in the direction shown by arrow 35. The slitting mechanism may be a manual device, or a conventional machine such as a power saw. As shown in FIG. 4, The resulting assembly consists of the member 23 which is adhered to the inner planar surface of the window edge, thus leaving exposed the outer planar surface of the window edge; and the flexible member 30 which extends into the space 18.

MODIFIED FORM OF THE INVENTION

Figure 5:
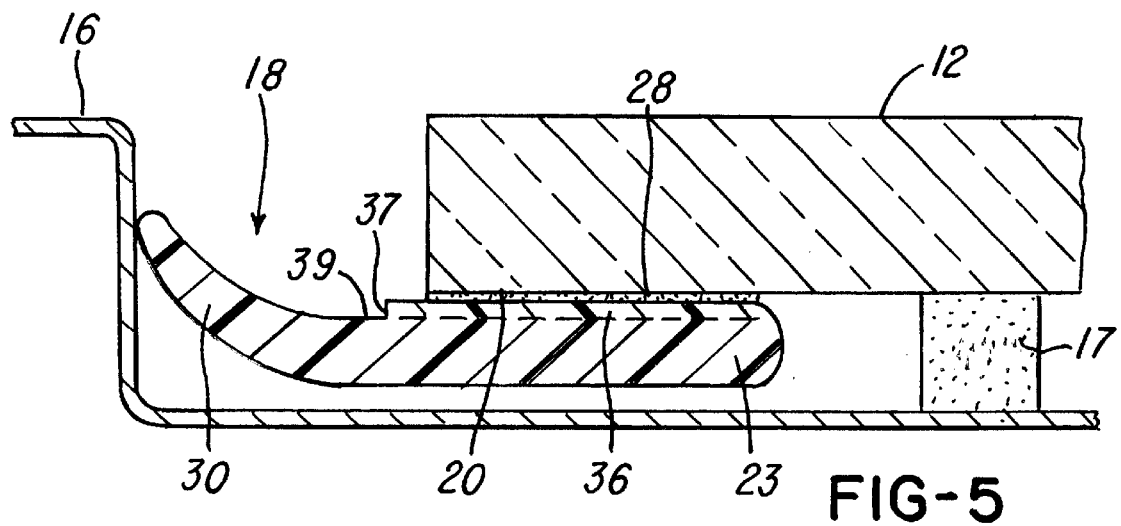
FIG. 5 is a view similar to FIG. 4 illustrating a modified form of invention.

FIG. 5 illustrates a modification; wherein the same reference numbers are applied to the same parts as above. In this modification, adhesion is provided between member 23 and inner planar surface 20 of the window edge by a different method. Instead of applying a primer 29 to the contacting surface 26 of member 23, a promoter in the form of a second elastomeric material 36 is co-extruded with the principal material to form a layer as the inner surface. The material is compatible with the adhesive applied to the window edge. Such co-extrusion is well known in the art as shown for example in U.S. Pat. No. 5,311,711 to Desir, Sr. The material 36 is a thermoplastic polyurethane (TPU), which is well known in the industry, and sold under various trade names. This material has a thickness between 0.005 and 0.020 inch, and becomes unitary with the primary material when extruded so that it becomes monolithic. The juncture of the principal material and the second material is shown in dash lines. The assembly of this form of the molding is the same as described above; after bonding of the second material to the window edge, the outer and interconnecting members are removed as before to create the final assembly.

The embodiments shown and described herein are exemplary, and other modifications are deemed to be within the spirit of the invention.

We claim:

1. In an automotive vehicle having a body panel and an adjacent window having an outer edge comprising inner and outer planar surfaces and a space between said body panel and said window edge; the method of installing an elastomeric molding around at least a portion of the periphery of said window edge, providing spaced opposing members gripping and retaining said planar surfaces of said window edge and further providing an interconnecting member therebetween, said members having window-contacting surfaces, adhering a first one of said gripping and retaining members to said inner planar surface of said window edge, and removing said other gripping and retaining member and said interconnecting member so that said first member is the sole member adhering to said window edge.

2. The method of claim 1 comprising the further step of providing indicia at the plane of the juncture of said interconnecting member and said first gripping and retaining member designating removal of said interconnecting member and said other gripping and retaining member.

3. The method of claim 2 comprising the step of providing said indicia in the form of a notch.

4. The method of claim 1 comprising the further step of proving a flexible member extending away from and coplanar with said first gripping and retaining member, and extending said flexible member into said space.

5. The method of claim 1 wherein said step of adhering said first gripping and retaining member comprises the steps of applying an adhesive material to said inner planar surface of said window edge and applying a primer material compatible with said adhesive material to said window-contacting surface of said first gripping and retaining member.

6. The method of claim 1 comprising the steps of forming said molding principally of a first elastomeric material, forming said window-contacting surface of said first gripping and retaining member of a second elastomeric material integral with said first elastomeric material, and adhering said second elastomeric material to said inner planar surface of said window edge.

7. The method of claim 6 comprising the steps of forming said second elastomeric material of a thermoplastic polyurethane and applying a polyurethane primer material to said window-contacting surface of said first gripping and retaining member to promote adhesion between said member and said window edge.

8. In an automotive vehicle having a body panel and an adjacent window having an outer edge comprising outer and inner planar surfaces and a space between said body panel and said window edge; an improved window molding extending around at least a portion of the periphery of said window edge, a first member of said molding having a window-contacting surface adapted to be adhered to said inner planar surface of said window edge, said molding being formed from a molding construction also comprised of a second spaced opposing member adapted to cooperate with said first member for gripping and retaining said window edge and further comprised of an interconnecting member between said first and second members, wherein said second member and said interconnecting member have been removed.

9. The molding of claim 8 comprising indicia at the plane of the juncture of said interconnecting member and said first member for designating removal of said interconnecting member and said second member.

10. The molding of claim 9 wherein said indicia is in the form of a notch.

11. The molding of claim 8 further comprising a flexible member extending away from and coplanar with said first member and extending into said space.

12. The molding of claim 8 wherein said first member is adapted to be adhered to said planar surface by an adhesive material on said inner planar surface of said window edge, and a compatible material on said window-contacting surface of said first member of said molding.

13. The molding of claim 12 wherein said molding is principally composed of a first elastomeric material, and said window-contacting surface of said first member is formed of a second elastomeric material co-extruded with said principal elastomeric material.

14. In combination, an automotive vehicle having a body panel, an adjacent window having an outer edge comprising outer and inner planar surfaces, a space between said body panel and said window edge, and an elastomeric window molding extending around at least a portion of the periphery of said window, said molding having a first member comprising a window-contacting surface adhered to said inner planar surface of said window edge, said molding being formed from a molding construction also comprised of a second spaced opposing member cooperating with said first member for gripping and retaining said window edge and further comprised of an interconnected member between said first and second members, wherein said second member and said interconnecting member have been removed.

15. The molding of claim 14 further comprising indicia at the plane of juncture of said interconnecting member and said first member for designating removal of said interconnecting member and said second member.

16. The molding of claim 15 wherein said indicia is a notch.

17. The molding of claim 14 further comprising a flexible member extending away from and coplanar with said first member and extending into said space.

18. The molding of claim 14 wherein said first member is adhered to said window edge by an adhesive material on said inner planar surface of said window edge, and a compatible material on said window-contacting surface of said first member of said molding.

19. The molding of claim 18 wherein said molding is principally composed of a first elastomeric material, and said window-contacting surface of said first member is formed of a second elastomeric material co-extruded with said principal elastomeric material.

20. The molding of claim 19 wherein said second elastomeric material is a thermoplastic polyurethane.

* * * * *